(12) United States Patent
Jha

(10) Patent No.: US 7,161,946 B1
(45) Date of Patent: Jan. 9, 2007

(54) TECHNIQUE FOR MULTIPROTOCOL TRANSPORT USING MPLS (MULTI-PROTOCOL LABEL SWITCHING)

(75) Inventor: Pankaj K. Jha, Fremont, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 852 days.

(21) Appl. No.: 10/021,992

(22) Filed: Dec. 12, 2001

(51) Int. Cl.
H04L 12/28 (2006.01)

(52) U.S. Cl. .................. 370/401; 370/392; 370/395.53

(58) Field of Classification Search .............. 370/470, 370/471, 473, 474, 475, 466, 392, 389
See application file for complete search history.

(56) References Cited

U.S. PATENT DOCUMENTS

| | | | |
|---|---|---|---|
| 6,771,662 B1 * | 8/2004 | Miki et al. .................. | 370/469 |
| 6,952,395 B1 * | 10/2005 | Manoharan et al. ......... | 370/219 |
| 6,965,572 B1 * | 11/2005 | Boodaghians ............... | 370/249 |
| 2001/0016914 A1 * | 8/2001 | Tabata ......................... | 713/201 |
| 2001/0049739 A1 * | 12/2001 | Wakayama et al. ......... | 709/230 |
| 2002/0101868 A1 * | 8/2002 | Clear et al. .................. | 370/389 |
| 2003/0026271 A1 * | 2/2003 | Erb et al. ..................... | 370/401 |
| 2004/0057424 A1 * | 3/2004 | Kokkonen ................... | 370/352 |
| 2004/0202171 A1 * | 10/2004 | Hama .......................... | 370/395.1 |
| 2004/0213221 A1 * | 10/2004 | Civanlar et al. ............. | 370/389 |
| 2004/0258073 A1 * | 12/2004 | Alexander et al. .......... | 370/395.5 |

OTHER PUBLICATIONS

"Data Communications, Computer Networks and Open Systems", Fourth Edition, By Fred Halsall, 1996, Section 9.5.2, pp. 499-501.*
"MPLS Architecture", Request for Comment 3031, Internet Engineering Task Force, Reston, Virginia, By E. Rosen, A. Viswanathan and R. Callon, Jan. 2001, pp. 1-57.

* cited by examiner

Primary Examiner—Ricky Q. Ngo
Assistant Examiner—Andrew C Lee
(74) Attorney, Agent, or Firm—Christopher P. Maiorana, PC

(57) ABSTRACT

A router generally comprising a first port, a second port, and a circuit. The first port may be configured to receive a frame having a network layer protocol identification. The second port may be connectable to a Multi-Protocol Label Switching (MPLS) network. The circuit may be configured to (i) insert an MPLS label into the frame while retaining the network layer protocol identification and (ii) present the frame in the MPLS network per the MPLS label.

18 Claims, 8 Drawing Sheets

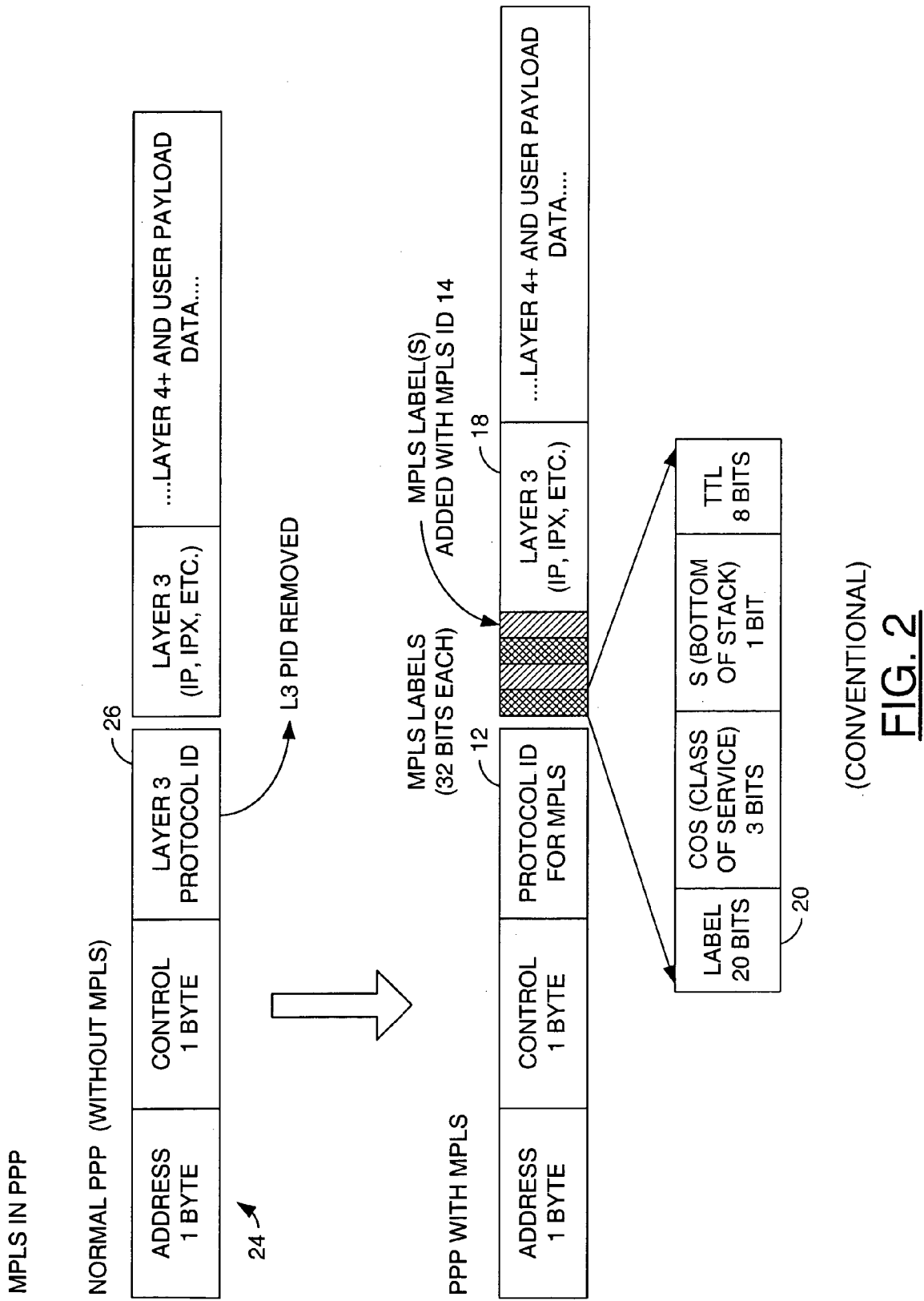
FIG. 2 (CONVENTIONAL)

TECHNIQUE FOR MULTIPROTOCOL TRANSPORT USING MPLS (MULTI-PROTOCOL LABEL SWITCHING)

FIELD OF THE INVENTION

The present invention relates to a method and/or architecture for network routing generally and, more particularly, to a router and method for sending multiple protocols over a single pipe within the network.

BACKGROUND OF THE INVENTION

Traditional Internet Protocol (IP) based networks require every node to look at network layer values of an Open Systems Interconnection (OSI) model (i.e., IP addresses) within each frame, refer to local network routing databases, and then make decisions about where to forward the frames. With a large number of nodes and networks, management of the local network routing tables becomes a difficult task, both for hardware and software. In addition, current IP networks provide a single routed path between any source and a destination. Therefore, even if network bandwidth is available, current protocols are not able to utilize different paths through the IP network efficiently.

Referring to FIG. 1, a drawing of an Ethernet frame 10 routed with a conventional Multi-Protocol Label Switching (MPLS) protocol is shown. The MPLS protocol has been developed for solving the routing table and single path problems. The MPLS protocol inserts a 16-bit protocol identification field 12 and one or more 32-bit shim headers 14 between an OSI data layer (i.e., layer 2) address 16 and an OSI network layer (i.e., layer 3) address 18. Each of the shim headers 14 contains a 20-bit value called an MPLS label 20. An OSI network layer (i.e., layer 3) protocol identification field 22 of the original Ethernet frame 10 is discarded in the process.

Referring to FIG. 2, a drawing of a Point-to-Point Protocol (PPP) frame 24 routed with the conventional MPLS protocol is shown. The PPP frame 24 is processed for the MPLS protocol by removing an OSI network layer protocol identification field 26. The MPLS protocol identification field 12 and one or more shim headers 14 are then added.

A path formed by the MPLS labels 20 is called a Label Switched Path (LSP). Signaling protocols establish paths and assign the 20-bit values at nodes along the paths. In addition, signaling protocols such as Resource Reservation Protocol (RSVP) have been extended to allow path reservation using MPLS to support proper Traffic Engineering (TE) over the paths. Using the header values to identify routes, network nodes are able to avoid processing the network layer (i.e., IP) addresses at every node to determine the path for a frame.

Currently, MPLS is being used for edge, core, and long-haul networks—for both legacy as well as optical networks. Carriers are using MPLS as a foundation for next-generation network offerings. Versions of MPLS are also targeted for replacing the control plane for Synchronous Optical Network/Synchronous Digital Hierarchy (SONET/SDH) and optical cross-connects. MPLS switching, MPLS-based data transport, MPLS virtual private networks, and so on, are presently big business. Many companies are involved in designing Complex Programmable Logic Devices (CPLDs), Application Specific Integrated Circuits (ASICs), Field Programmable Gate Arrays (FPGAs), boards, and systems based on MPLS.

A problem, however, is limited support for multiprotocol transport in MPLS. The MPLS protocol predominantly carries IP traffic. Other protocols can be sent, but to do so requires changes to signaling protocols. Even when the signal protocols are changed, only a single type of protocol can be carried over a single path. Each time that a new protocol is added, the signaling software needs to be upgraded at every node to account for the new protocol.

In conventional protocols, the moment a router at the edge of an MPLS network adds the MPLS labels 20 the original OSI network layer protocol identification 22/26 is lost. Thereafter, the only way for a terminal router at the end of the MPLS network to determine the OSI network layer protocol identification 22/26 required to reconstruct the Ethernet frame 10 or PPP frame 24 is to rely on signaling mechanisms within the MPLS protocol. The MPLS signaling mechanisms negotiate a protocol to be transported on an LSP. Therefore, different LSPs are required for transporting different protocols. In addition, every node along the path needs to be aware of any new protocol being established, thus resulting in a large and dynamic software/hardware infrastructure.

Another problem arises with signaling protocols such as RSVP where a path needs to be periodically refreshed to keep the path alive. Because an individual LSP is required for each flow, many LSPs are commonly required between two end points. With many LSPs, a large number of refreshes cause heavy loads on processors and on the network. The above-mentioned problems have restricted wide adoption of MPLS. In addition, MPLS systems have been complex and expensive due to additional hardware complexity required for multi-service transport.

SUMMARY OF THE INVENTION

The present invention concerns a router generally comprising a first port, a second port, and a circuit. The first port may be configured to receive a frame having a network layer protocol identification. The second port may be connectable to a Multi-Protocol Label Switching (MPLS) network. The circuit may be configured to (i) insert an MPLS label into the frame while retaining the network layer protocol identification and (ii) present the frame in the MPLS network per the MPLS label.

The objects, features and advantages of the present invention include providing a router and method that may provide for (i) sending multiple protocols/flows simultaneously in a Multi-Protocol Label Switching (MPLS) Label Switched Path, (ii) constructing paths for certain Traffic Engineering parameters over a network and/or multiple networks then using each path for multiple types of traffic, (iii) simpler, less expensive, and more scalable hardware and software solutions for devices and networking systems, (iv) consuming fewer network resources to accommodate multi-protocol transport, (v) a capability where network providers can establish network paths for customers independent of the type of data the customers are sending, and/or (vi) no additional hardware and/or software burden on intermediate MPLS nodes for each end system protocol that is to be sent on MPLS paths.

BRIEF DESCRIPTION OF THE DRAWINGS

These and other objects, features and advantages of the present invention will be apparent from the following detailed description and the appended claims and drawings in which:

FIG. 2 is a drawing of a conventional PPP frame in MPLS;

DETAILED DESCRIPTION OF THE PREFERRED EMBODIMENTS

Figure 1:
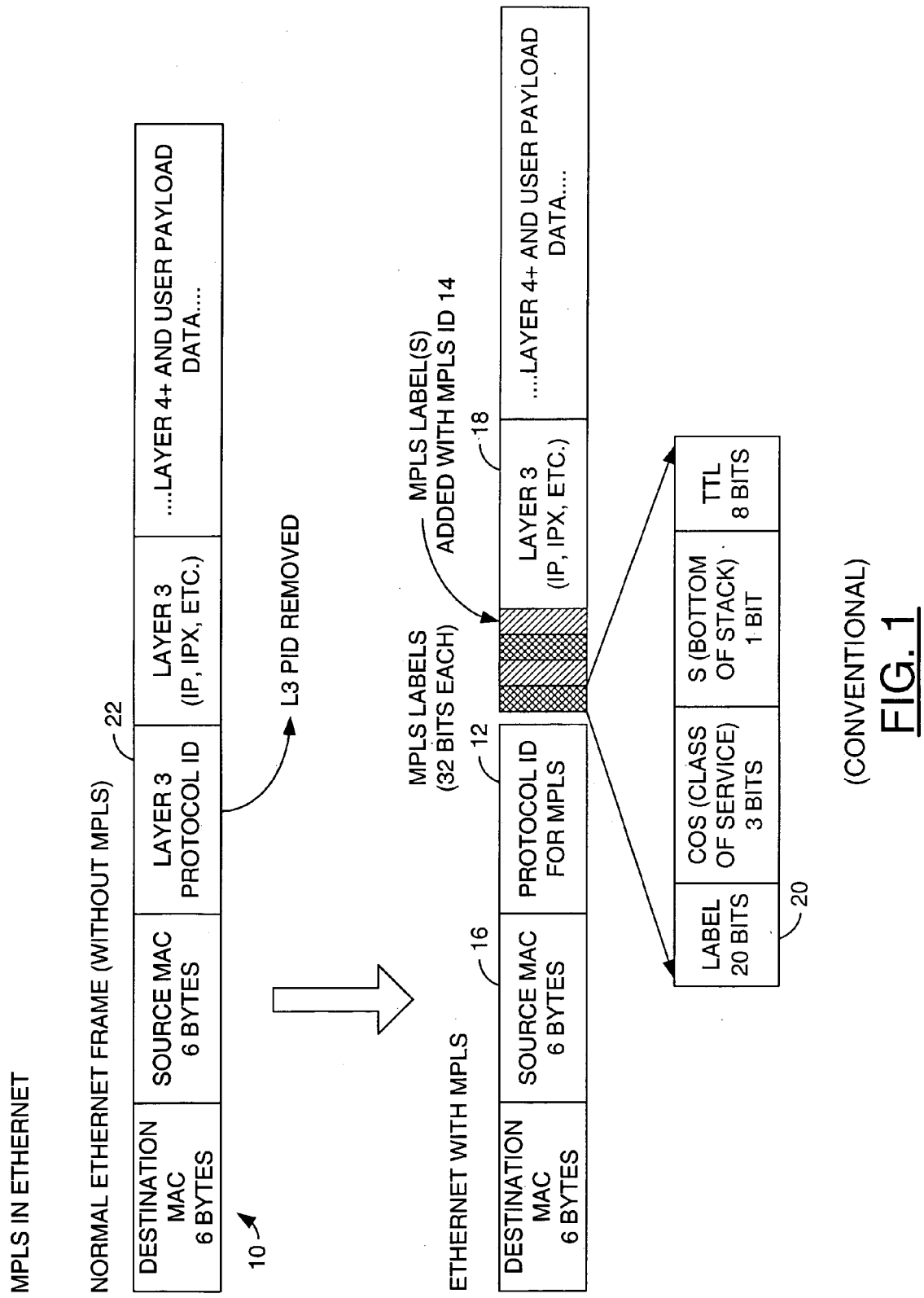
FIG. 1 is a drawing of a conventional Ethernet frame in MPLS.
Figure 3:
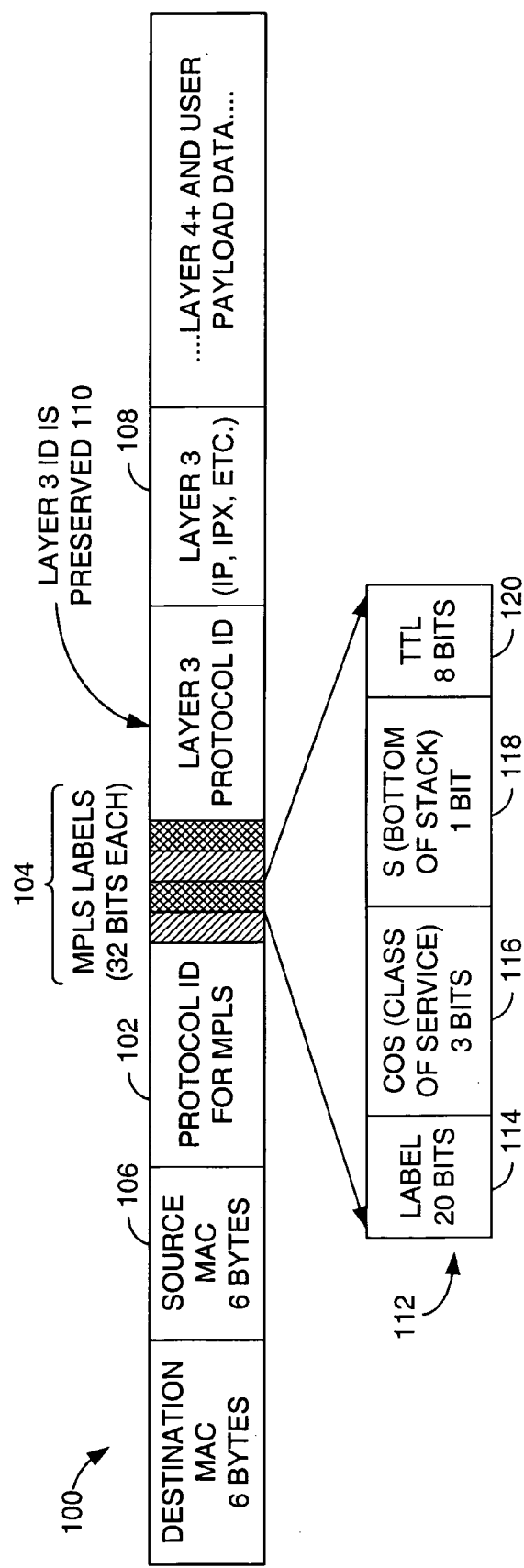
FIG. 3 is a drawing of an Ethernet frame in MPLS in accordance with the present invention.

Referring to FIG. 3, a drawing is shown of an Ethernet frame in a Multi-Protocol Label Switching (MPLS) protocol 100 in accordance with a preferred embodiment of the present invention. The MPLS protocol is generally defined in the document, "Multiprotocol Label Switching Architecture", Internet Engineering Task Force (IETF), Reston Va., Request For Comment (RFC) 3031, hereby incorporated by reference in its entirety. The MPLS protocol is generally modified by the present invention.

Modifying the Ethernet frame for the MPLS generally comprises adding a field 102 and a stack 104 to the Ethernet frame. The field 102 may be implemented as an MPLS protocol identification field as defined by the RFC 3031. The stack 104 may be implemented as an MPLS label stack as defined by the RFC 3031.

The MPLS protocol identification field 102 and the MPLS label stack 104 may be inserted into the Ethernet frame between a field 106 and a field 108. The field 106 may contain an Open Systems Interconnection (OSI) model data link layer (e.g., layer 2) address. The field 108 may contain an OSI network layer (e.g., layer 3) address. The present invention may depart from the RFC 3031 by retaining a field 110 between the field 106 and the field 108. The field 110 may contain an OSI network layer protocol identification for the Ethernet frame. Therefore, MPLS switching may be made completely independent of the layer 3 protocol identification and other fields.

The MPLS label stack 104 may contain one or more headers 112. Each header 112 may comprise a label 114, a class of service 116, a flag (e.g., S) 118 for indicating a bottom of stack, and a Time To Live (TTL) value 120. The labels 114 of each header 112 may be used with a Label Switched Path (LSP) through an MPLS network (FIG. 5).

Figure 4:
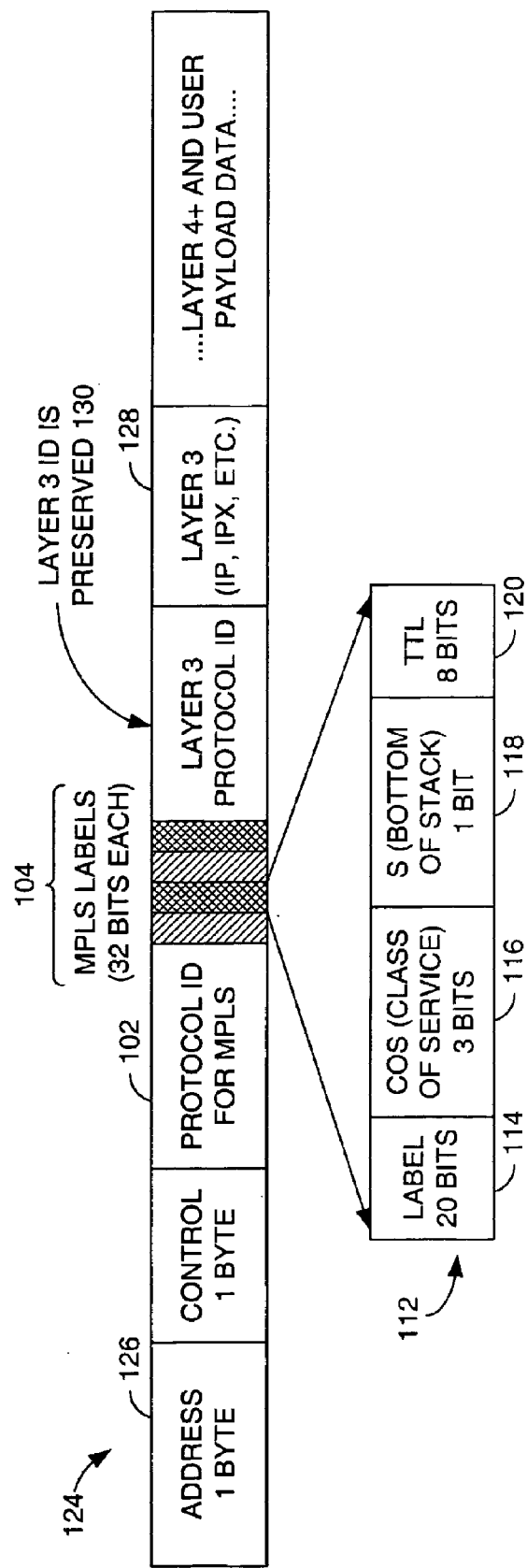
FIG. 4 is a drawing of a PPP frame in MPLS in accordance with the present invention.

Referring to FIG. 4, a drawing is shown of a Point-to-Point Protocol (PPP) frame in MPLS 124. The PPP frame may be modified by adding the MPLS protocol identification field 102 and the MPLS stack 104 between a field 126 and a field 128. The field 126 may contain an OSI data link layer address. The field 128 may contain an OSI network layer address. A field 130 may be retained as the MPLS protocol identification field 102 and the MPLS stack fields 104 are added. The field 130 may contain an OSI network layer protocol identification for the PPP frame.

Figure 5:
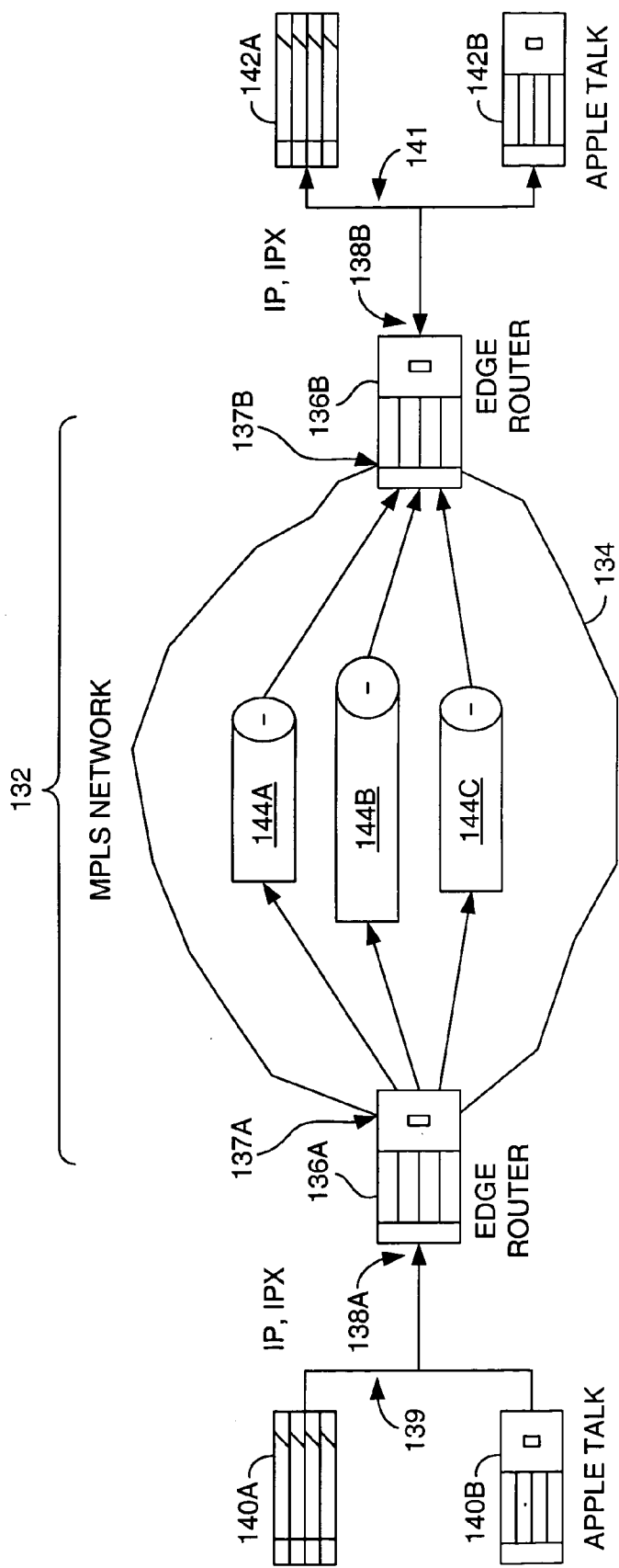
FIG. 5 is a block diagram of a network.

Referring to FIG. 5, a block diagram of a network 132 is shown. The network 132 generally comprises a physical layer 134 and two or more routers 136A–B. Additional nodes or routers 136 (not shown) may be provided within the network 132 between the router 136A and the router 136B.

The network 132 may be implemented as an MPLS network. The router 136A may be implemented as an edge router of the MPLS network 132. The router 136B may be implemented as another edge router of the MPLS network 132.

The edge router 136A may have a port 137A for connecting to the MPLS physical layer 134. The edge router 136A may have another port 138A for connecting to another network 139. The network 139 may comprise one or more nodes 140A–B. Each node 140A–B may communicate in the network 139 with a similar and/or different protocol. The edge router 136B may have a port 137B for connecting to the MPLS physical layer 134. The edge router 136B may have another port 138B for connecting to another network 141. The network 141 may comprise one or more nodes 142A–B. Each node 142A–B may communicate in the network 141 with a similar and/or different protocol.

The MPLS network 132 may allow a node (e.g., node 140A) on the network 139 to communicate with another node (e.g., node 142A) on the network 141. Communications through the MPLS network 132 may be enabled by creating LSPs 144A–C through conventional signaling protocols. Signaling protocols such as Resource Reservation Protocol (RSVP) generally allow path reservations using MPLS to support proper Traffic Engineering (TE) over the LSPs 144A–C. Using the MPLS labels 112 to identify a particular LSP 144, the MPLS network nodes 136 may be able to avoid processing the OSI network layer addresses at every node 136 to determine the path for a frame.

In an example, an AppleTalk® frame originating from the node 140B may be sent to the edge router 136A over the network 139. The edge router 136A may operate as an ingress node to the MPLS network 132 for the AppleTalk® frame. A signaling protocol may establish the LSP 144C as the proper traffic-engineered path for the AppleTalk® frame to the edge router 136B. The edge router 136A may incorporate an appropriate MPLS protocol identification and an MPLS stack into the AppleTalk® frame. The AppleTalk® frame in MPLS may then be transferred along the LSP 144C per the MPLS labels to the edge router 136B. The edge router 136b may operate as an egress node from the MPLS network 132 for the AppleTalk® frame. The edge router 136B generally remove the MPLS protocol identification and the MPLS stack. Since the layer 3 protocol identification information for the AppleTalk® frame has been retained, the edge router 136B may not need to recreate the layer 3 protocol identification from MPLS label value lookups. Thereafter, the edge router 136B may present the AppleTalk® frame on the network 141 where it may be received by the node 142B.

The operations of the edge router 136A and the edge router 136B in routing the AppleTalk® frame along the LSP 144C are generally independent of the protocol of the AppleTalk® frame. As a result, the edge routers 136A and 136B may also route frames having other protocols along the same LSP 144C. The transfers along the LSP 144C may be unidirectional or bidirectional. For example, an IP frame originating from node 142A may be received by the edge router 136B. The edge router 136B, operating as an ingress node, may insert the appropriate MPLS protocol identification and the MPLS stack into the IP frame. The IP frame in MPLS may then be transferred along the LSP 144C to the edge router 136A. The edge router 136A, operating as an egress node, may remove the MPLS protocol identification and the MPLS stack without the need to recreate the layer 3 protocol identification for the IP frame from MPLS label value lookups. The IP frame may then be presented to the network 139 for reception by the node 140A. Likewise, an Internetwork Packet Exchange (IPX) frame may be routed from the node 140A through the LSP 144C to the node 142A.

A result of the present invention may be that the MPLS network 132 may carry the AppleTalk® frame, the IP frame, and the IPX frame over the same LSP 144C. Traffic Engineering (TE) parameters over a single MPLS network or multiple networks may be use to establish LSPs 144 for sending multiple types of traffic. The result is generally a simpler, cheaper, and more scalable hardware and software solution for both devices and networking systems. For example, network providers may give a traffic-engineered path to a customer and let the customer use the path for any type of data at any time. The network providers may not be concerned with signaling protocols for any of the protocols used by the customer. The path may now be used by the customer as a pipe for any purpose without additional burdens on the network provider.

Figure 6:
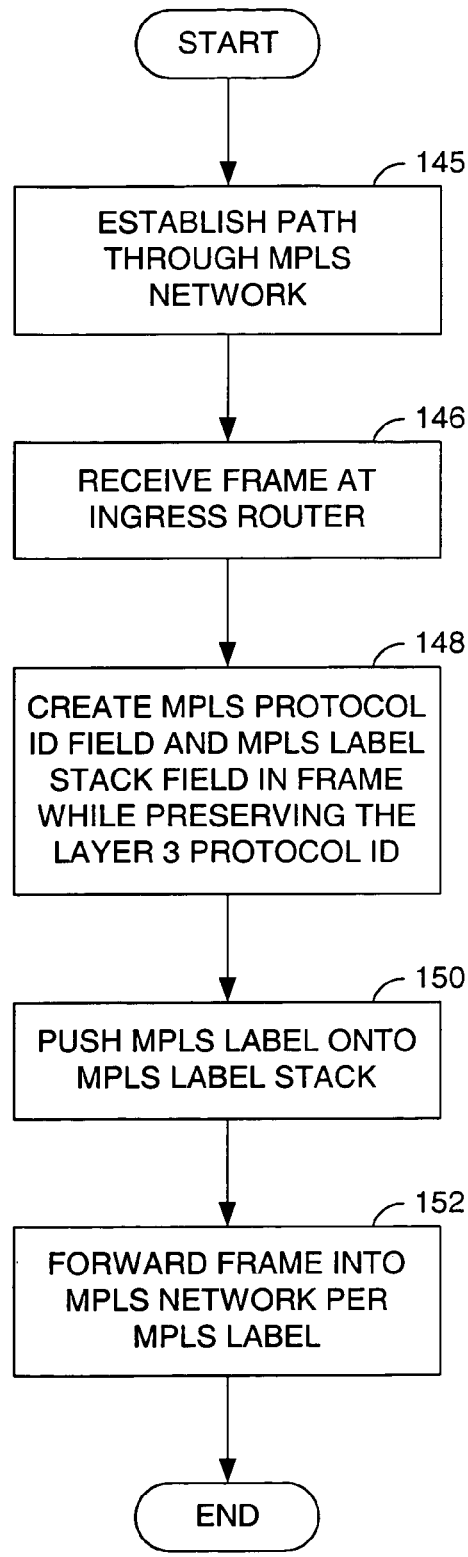
FIG. 6 is a flow diagram of a method for inserting a frame into the network.

Referring to FIG. 6, a flow diagram of an ingress method into the MPLS network 132 is shown. An LSP 144 may initially be established through the MPLS network 132 using conventional signaling protocols (e.g., block 145). During or after establishing the LSP 144, a frame may be received at an ingress edge router 136 (e.g., block 146). The ingress edge router 136 may create the MPLS protocol identification field 102 and the MPLS stack field 104 in the frame while preserving the original layer 3 protocol identification of the frame (e.g., block 148). The ingress edge router 136 may then push one or more MPLS labels 112 onto the MPLS label stack 104 for the LSP 144 (e.g., block 150). The frame in MPLS format may then be forwarded into the MPLS network 132 per the MPLS labels 112 for transmission.

Figure 7:
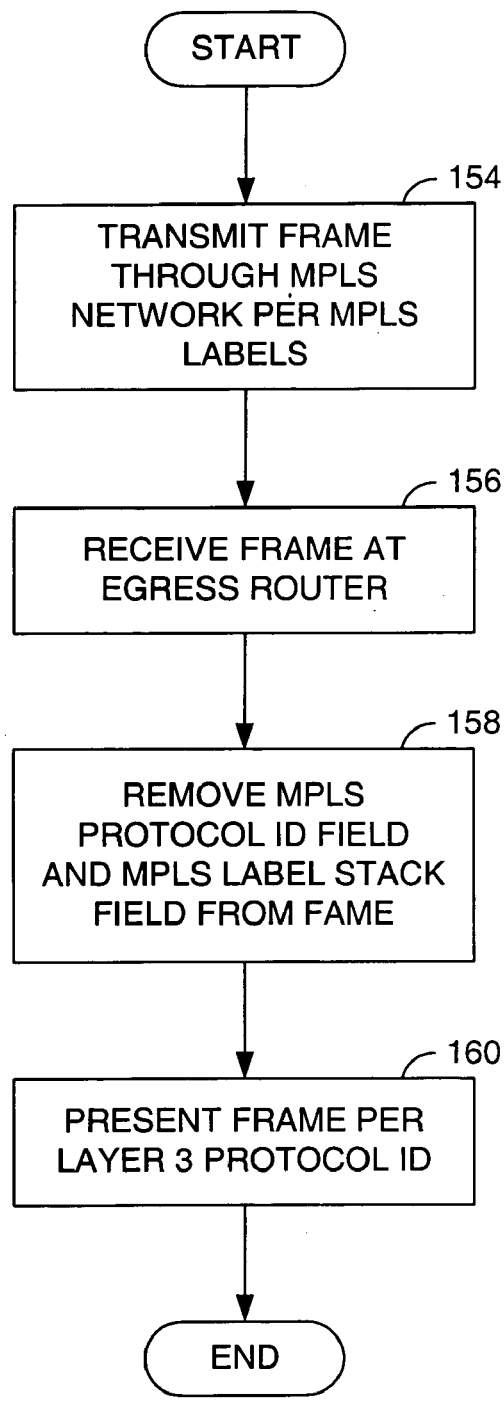
FIG. 7 is a flow diagram of a method for extracting the frame from the network.

Referring to FIG. 7, a flow diagram of an egress method from the MPLS network 132 is shown. The frame in MPLS format may be transmitted through the MPLS network 132 (e.g., block 154) for reception by an egress edge router 136 (e.g., block 156). The egress edge router 136 may remove the MPLS protocol identification field 102 and the MPLS label stack 104 from the frame (e.g., block 158). The egress edge router 136 is generally not required to reconstruct the original layer 3 protocol identification since the original layer 3 protocol identification was retained by the ingress edge router 136 (e.g., block 148 of FIG. 6). The egress edge router 136 may then present the frame external to the MPLS network 132 (e.g., block 160).

Figure 8:
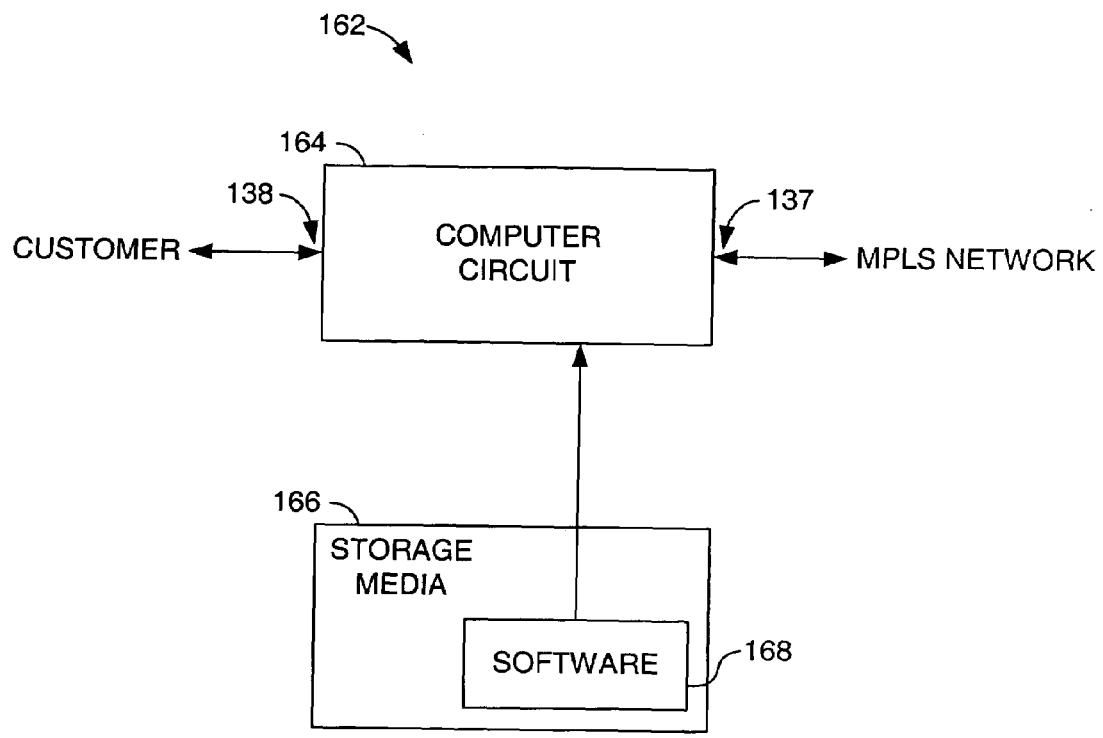
FIG. 8 is a block diagram of an example circuit implementing the insertion and extraction methods.

Referring to FIG. 8, a block diagram of an example circuit 162 implementing the ingress and egress method is shown. The circuit 162 generally comprises a computer circuit 164 and a storage medium 166. The computer circuit 164 may connect to the port 137 interfacing to an MPLS network. The computer circuit 164 may connect to the port 138 interfacing to a customer for receiving and sending frames of data. The storage medium 166 may contain a software program 168 defining the ingress method and/or the egress method described above in FIGS. 6 and 7. The software program 168 may be readable and executable by the computer circuit 164 to implement the ingress method and egress method according to the teachings of the present specification, as will be apparent to those skilled in the relevant art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMs, EPROMs, EEPROMs, Flash memory, magnetic or optical cards, or any type of media suitable for storing electronic instructions.

The present invention may also be implemented by the preparation of ASICs, FPGAs, or by interconnecting an appropriate network of conventional component circuits, as is described herein, modifications of which will be readily apparent to those skilled in the art(s).

As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

AppleTalk® is a registered trademark of Apple Computers, Inc.

The invention claimed is:

1. A router comprising:
   a first port configured to receive a first frame having (i) a source media access control (MAC) address, (ii) a first network layer protocol identification immediately following said source MAC address and (iii) a network layer address following said network layer protocol identification;
   a second port connectable to a Multi-Protocol Label Switching (MPLS) network; and
   a circuit configured to (i) insert a first MPLS label into said first frame while retaining said first network layer protocol identification, (ii) present said first frame in said MPLS network, (iii) receive a second frame having a second MPLS label and a second network layer protocol identification, and (iv) present said second frame external to said MPLS network per said second network layer protocol received in said second frame.

2. The router according to claim 1, wherein said circuit is further configured to:
   receive a second frame having a second network layer protocol identification having a difference value than said first network layer protocol identification;
   insert a second MPLS label into said second frame while retaining said second network layer protocol identification; and
   forward said second frame in said MPLS network.

3. The router according to claim 2, wherein said circuit is further configured to:
   transmit said first frame along a path in said MPLS network; and
   transmit said second frame along said path.

4. The router according to claim 1, wherein said circuit is further configured to:
   transmit a plurality of frames having a plurality of different protocol through a single traffic-engineered path in said MPLS network.

5. The router according to claim 4, wherein said transmission through said traffic-engineered path is bidirectional.

6. The router according to claim 1, wherein the circuit is further configured to:
   create an MPLS label stack field between a data link layer address field and a network layer protocol identification field in said first frame; and
   insert said first MPLS label into said MPLS label stack field.

7. The router according to claim 1, wherein said first frame comprises a Point-to-Point Protocol frame.

8. A method of operation in a Multi-Protocol Label Switching (MPLS) network comprising the steps of:
- (A) receiving a first frame having (i) a source media access control (MAC) address, (ii) a first network layer protocol identification immediately following said source MAC address and (iii) a network layer address following said first network layer protocol identification;
- (B) inserting a first MPLS label into said first frame while retaining said first network layer protocol identification;
- (C) presenting said first frame in said MPLS network;
- (D) receiving a second frame having a second network layer protocol identification different than said first network layer protocol identification;
- (E) inserting a second MPLS label into said second frame while retaining said second network layer protocol identification; and
- (F) forwarding said second frame in said MPLS network.

9. The method according to claim 8, further comprising the steps of:
- transmitting said first frame along a path in said MPLS network; and
- transmitting said second frame along said path.

10. The method according to claim 8, further comprising the steps of:
- receiving a second frame having a second MPLS label and a second network layer protocol identification; and
- presenting said second frame external to said MPLS network per said second network layer protocol identification received in said second frame.

11. The method according to claim 8, further comprising the step of:
- transmitting a plurality of frames having a plurality of different protocol through a single traffic-engineered path in said MPLS network.

12. The method according to claim 11, wherein transmitting through said traffic-engineered path is bidirectional.

13. The method according to claim 8, wherein step (B) comprises the sub-steps of:
- creating an MPLS label stack field between a data link layer address field and a network layer protocol identification field in said first frame; and
- inserting said first MPLS label into said MPLS label stack field.

14. The method according to claim 8, wherein said MPLS network is defined by a Request For Comment 3031 provided by an Internet Engineering Task Force.

15. The method according to claim 8, wherein said steps (A) through (C) are stored in a storage medium as a software program that is readable and executable by a router to insert said first frame into said MPLS network.

16. The method according to claim 8, wherein said first network protocol identifier indicates a network layer protocol of data encapsulated by said first frame.

17. The method according to claim 8, wherein said first frame and second frame and are both transferred in a same label switched path in said MPLS network.

18. A router comprising:
- means for receiving a first frame having (i) a source media access control (MAC) address, (ii) a first network layer protocol identification immediately following said source MAC address and (iii) a network layer address following said first network layer protocol identification;
- means for inserting a first Multi-Protocol Label Switching (MPLS) label into said first frame while retaining said first network layer protocol identification;
- means for forwarding said frame in an MPLS network;
- means for receiving a second frame having a second network layer protocol identification different than said first network layer protocol identification;
- means for inserting a second MPLS label into said second frame while retaining said second network layer protocol identification; and
- means for forwarding said second frame in said MPLS network.

* * * * *